(12) United States Patent
Salgado et al.

(10) Patent No.: US 8,223,364 B2
(45) Date of Patent: *Jul. 17, 2012

(54) PRINTER DRIVER, APPARATUS AND METHODS FOR CONROLLING A PRINTER FROM A DEVMODE DATA STRUCTURE

(75) Inventors: David Salgado, Victor, NY (US); Jeremy Griffith, East Rochester, NY (US); Jonathan Allen Edmonds, Silverton, OR (US); Raymond Sabbagh, Harbor City, CA (US)

(73) Assignee: Xerox Corporation, Norwalk, CT (US)

( * ) Notice: Subject to any disclaimer, the term of this patent is extended or adjusted under 35 U.S.C. 154(b) by 1225 days.

This patent is subject to a terminal disclaimer.

(21) Appl. No.: 11/778,868

(22) Filed: Jul. 17, 2007

(65) Prior Publication Data

US 2009/0021771 A1   Jan. 22, 2009

(51) Int. Cl.
*G06F 3/12* (2006.01)
(52) U.S. Cl. ...... 358/1.15; 358/1.13; 715/204; 715/273; 715/735
(58) Field of Classification Search ........... 358/1.1–3.23
See application file for complete search history.

(56) References Cited

U.S. PATENT DOCUMENTS

| 5,872,569 | A | 2/1999 | Salgado |
| 5,987,535 | A | 11/1999 | Knodt et al. |
| 6,470,155 | B1 | 10/2002 | Martin et al. |
| 6,748,183 | B2 | 6/2004 | Edmonds |
| 2004/0051891 | A1* | 3/2004 | Moro et al. ..... 358/1.9 |
| 2006/0012807 | A1* | 1/2006 | Bos et al. ..... 358/1.8 |
| 2006/0170943 | A1* | 8/2006 | Hanson et al. ..... 358/1.13 |
| 2006/0265671 | A1* | 11/2006 | Shiono et al. ..... 715/859 |
| 2006/0274164 | A1* | 12/2006 | Kimura et al. ..... 348/231.3 |
| 2006/0282772 | A1* | 12/2006 | Chamberlin et al. ..... 715/700 |

* cited by examiner

*Primary Examiner* — Benny Q Tieu
*Assistant Examiner* — Marcellus Augustin
(74) *Attorney, Agent, or Firm* — Ronald E. Prass, Jr.; Prass LLP

(57) ABSTRACT

Disclosed are methods of controlling operation of a printer, apparatus and computer-readable medium. The embodiments control operation of a printer by displaying to a user a print user interface including selectable document settings and a default/saved settings control, the default/saved settings control displaying a list of at least one saved default setting and command settings, the at least one saved default setting including selected ones of the document settings, the command settings allowing the user to create additional default settings and to delete the at least one saved default setting, and controlling printing of a document to print on the printer using the saved default setting and the selected ones of the document settings.

20 Claims, 8 Drawing Sheets

PRINTER DRIVER, APPARATUS AND METHODS FOR CONROLLING A PRINTER FROM A DEVMODE DATA STRUCTURE

CROSS REFERENCE TO RELATED APPLICATIONS

This application is related to the following US applications, filed simultaneously with this application, and the disclosures of which are incorporated by reference herein in their entirety: 1) Ser. No. 11/778,829; 2) Ser. No. 11/778,851; 3) Ser. No. 11/778,883; and 4) Ser. No. 11/778,901.

BACKGROUND

Disclosed herein are methods for controlling printing, as well as corresponding apparatus and computer-readable medium.

Image forming devices such as printers, copiers and multifunction devices provide users the ability to print from a device such as a desktop or laptop computer, a handheld computer, or other electronic devices, to a printer connected to the device. The electronic devices may be stand alone devices, or may be connected in a network, such as in a business computing environment, which may include one or more printers.

In order for a printer to interface with and function with the computer to which it is connected, a printer driver can typically be installed on the computer. A printer driver is software which controls the printer from the computer. The printer driver may include a user interface which may be typically accessed by a user through an operating system or an application program, such as a word processing program, a spreadsheet program, or other types of programs, and viewed on a display.

Printer drivers in use may include default settings. The default settings may allow a user to set and save default settings for use with the printer. For example, a user may be able to set default settings such as paper size, tray to print from, draft or high-quality mode, various color options, page layout, and the like. When such default settings are set, and the user later prints, the default settings will automatically be used, usually unless the user manually changes one or more of the settings. The default settings will also apply across all applications that the printer is used with, and for all documents. For example, the default setting would be used when printing from a word processing application, from a spreadsheet application, from a drawing application, from a browser application, and for all documents printed from the applications.

When print driver software is created by the manufacturer, the manufacturer may set some manufacturer default settings (also known as factory defaults), that may be specified by the device's manufacturer. An administrator may set administrator default settings. Further, a user may set user default settings for the print driver. Current printer drivers do not include a clear presentation of this information that is easy to understand and allows intuitive use of default features by users and administrators.

SUMMARY

According to aspects of the embodiments, there is provided methods of controlling operation of a printer, and corresponding apparatus and computer-readable medium. The methods include displaying to a user a print user interface including selectable document settings and a default/saved settings control, the default/saved settings control displaying a list of at least one saved default setting and command settings, the at least one saved default setting including selected ones of the document settings, the command settings allowing the user to create additional default settings and to delete the at least one saved default setting, and controlling printing of a document to print on the printer using the saved default setting and the selected ones of the document settings.

DETAILED DESCRIPTION

Figure 1:
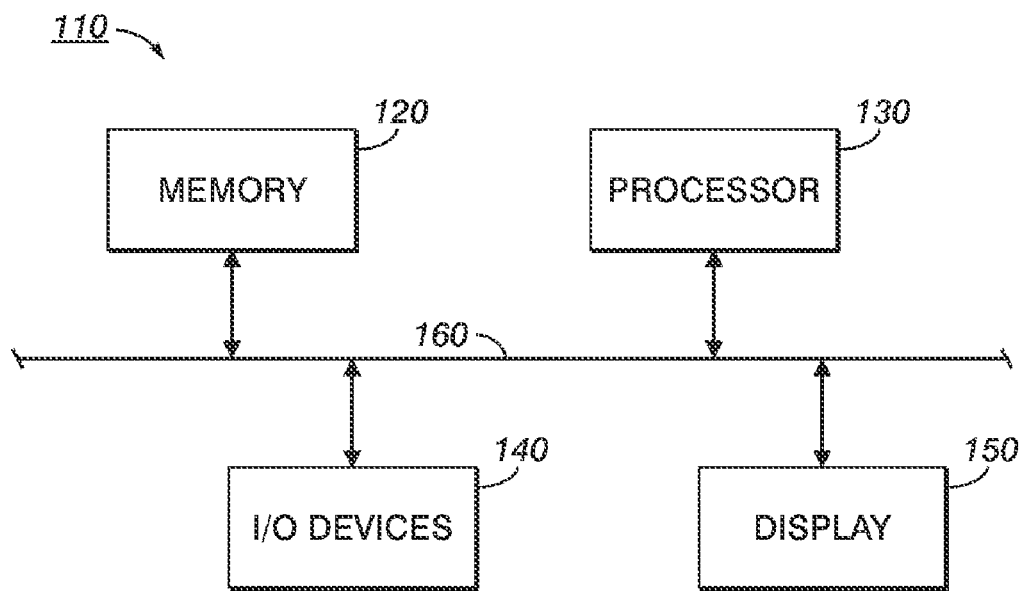
FIG. 1 illustrates a block diagram of a system for controlling a printer.

Aspects of the embodiments disclosed herein relate to methods for controlling operation of a printer, and corresponding apparatus and computer-readable medium. The disclosed embodiments allow a user to select and save one or more document settings as a document default setting to be used when printing that particular document.

The disclosed embodiments include methods of controlling operation of a printer. The methods include displaying to a user a print user interface including selectable document settings and a default/saved settings control, the default/saved settings control displaying a list of at least one saved default setting and command settings, the at least one saved default setting including selected ones of the document settings, the command settings allowing the user to create additional default settings and to delete the at least one saved default setting, and controlling printing of a document to print on the printer using the saved default setting and the selected ones of the document settings.

The disclosed embodiments further include an apparatus for controlling printing of a document on a printer. The apparatus includes a memory that stores print driver instructions; and a processor that executes the print driver instructions to cause printing of the document when receiving a print command for printing from a user by: displaying to the user a print user interface including selectable document settings and a default/saved settings control, the default/saved settings control displaying a list of at least one saved default setting and command settings, the at least one saved default setting including selected ones of the document settings, the command settings allowing the user to create additional default settings and to delete the at least one saved default setting; and controlling printing of a document to print on the printer using the saved default setting and the selected ones of the document settings.

The disclosed embodiments further include a computer-readable medium that includes a computer-usable data carrier storing instructions, the instructions when executed by a computer causing the computer to control printing by: displaying to the user a print user interface including selectable document settings and a default/saved settings control, the default/saved settings control displaying a list of at least one saved default setting and command settings, the at least one saved default setting including selected ones of the document settings, the command settings allowing the user to create additional default settings and to delete the at least one saved default setting; and controlling printing of a document to print on the printer using the saved default setting and the selected ones of the document settings.

The term "application" in the disclosed embodiments refers to a program designed for end users of a computing device, such as a word processing program, a database program, a browser program, a spreadsheet program, a gaming program, and the like. An application is distinct from systems programs, which consist of low-level programs that interact with the computing device at a very basic level, such as an operating system program, a compiler program, a debugger program, programs for managing computer resources, and the like.

A printer "document setting" in the disclosed embodiments refers to a setting of an attribute of a document to be printed that can be selected and saved by the user. Examples of printer document settings are settings for stapled or not stapled, paper size, watermark, paper tray, print resolution, and color printing or black and white printing. A printer "default setting" in the disclosed embodiments refers to one or more document settings that are saved as a default setting to be automatically used for printing unless manually changed at the time of printing. A printer "document default setting" in the disclosed embodiments refers to one or more document settings that are saved to be automatically used for printing the particular document unless the settings are manually changed at the time of printing.

An "application default setting" in the disclosed embodiments refers to one or more document settings that are saved as an application default setting to be automatically used for printing of documents opened in the application unless the settings are manually changed at the time of printing. A "manufacturer default setting" in the disclosed embodiments refers to one or more document settings that are saved as specified by a printer manufacturer. An "administrator default setting" in the disclosed embodiments refers to one or more document settings that are saved by an administrator, and that override and replace a manufacturer default setting.

A "user default setting" in the disclosed embodiments refers to one or more document settings that are saved by a user as a user default setting, and can replace an administrator default setting. A "saved setting default" in the disclosed embodiments refers to one or more document settings that are saved by a user with an identifying name selected by the user.

FIG. 1 illustrates a diagram of a system 110. The system 110 may be embodied within devices such as a desktop computer, a laptop computer, a handheld computer, a handheld communication device, or another type of computing device, or the like. The system 110 may include a memory 120, a processor 130, input/output devices 140, a display 150 and a bus 160. The bus 160 may permit communication and transfer of signals among the components of the computing device 110.

Processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of static storage device that stores static information and instructions for processor 130. The memory 120 may be any memory device that stores data for use by system 110.

Input/output devices 140 (I/O devices) may include one or more conventional input mechanisms that permit a user to input information to the system 110, such as a microphone, touchpad, keypad, keyboard, mouse, pen, stylus, voice recognition device, buttons, etc., and output mechanisms such as one or more conventional mechanisms that output information to the user, including a display, one or more speakers, a storage medium, such as a memory, magnetic or optical disk, disk drive, a printer device, etc., and/or interfaces for the above. The display 150 may typically be an LCD or CRT display as used on many conventional computing devices, or any other type of display device.

The system 110 may perform functions in response to processor 130 by executing sequences of instructions or instruction sets contained in a computer-readable medium, such as, for example, memory 120. Such instructions may be read into memory 120 from another computer-readable medium, such as a storage device, or from a separate device via a communication interface, or may be downloaded from an external source such as the Internet. The system 100 may be a stand-alone system, such as a personal computer, or may be connected to a network such as an intranet, the Internet, or the like.

The memory 120 may store instructions that may be executed by the processor to perform various functions. For example, the memory may store printer driver instructions to allow the system to perform various printing functions in association with a particular printer connected to the system. The printer driver instructions are typically unique to each specific type of printer, and the system 110 may store a plurality of print drivers each for a different printer.

Figure 2:
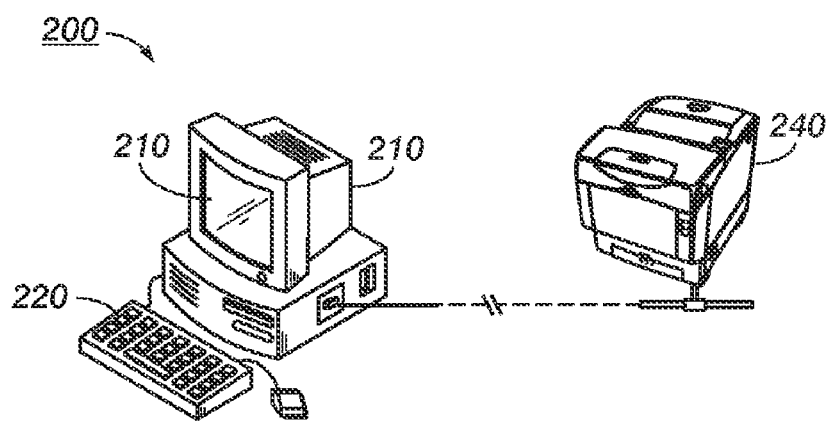
FIG. 2 illustrates a block diagram of a system for controlling a printer.

FIG. 2 illustrates a system 200. The system 200 includes a computer 210, which includes the elements of system 110, including the memory 120, the processor 130, I/O devices 140 and a display 150. The computer 210 could be a standard personal computer, or could be another type of computing device such as a handheld computer, a phone, a laptop computer, or the like.

The system 200 may also include a keyboard 220 functioning as an input device. The keyboard may be replaced or supplemented by the input devices as illustrated in FIG. 1.

The system 200 may also include a display 230 functioning as an output device for displaying images generated or received by the computer 210, corresponding to display 150 shown in FIG. 1. The display 230 may display images to be viewed by a user, such as various application programs, a user interface (UI), text, photographic images, or the like. For example, the display may generate a user interface in response to a print driver stored in memory 120, such as a user interface for the print driver. The print driver could also be stored in a memory in a network that the computer 210 is connected to, such as in a network server.

The system 200 may have a printer 240 connected thereto for printing data such as images, text, or the like in response to a user directing the computer 210 to print, for example. In response to such a print command, the processor will typically cause the print driver to communicate with the printer to perform the needed printing.

The system 200 may be connected to a network, such as such as an intranet, the Internet, a wireless network, or the like. In addition, the system 200 may be connected to a plurality of printers such as printer 240. The plurality of printers may be of a same printer type or of varying printer types.

Figure 3:
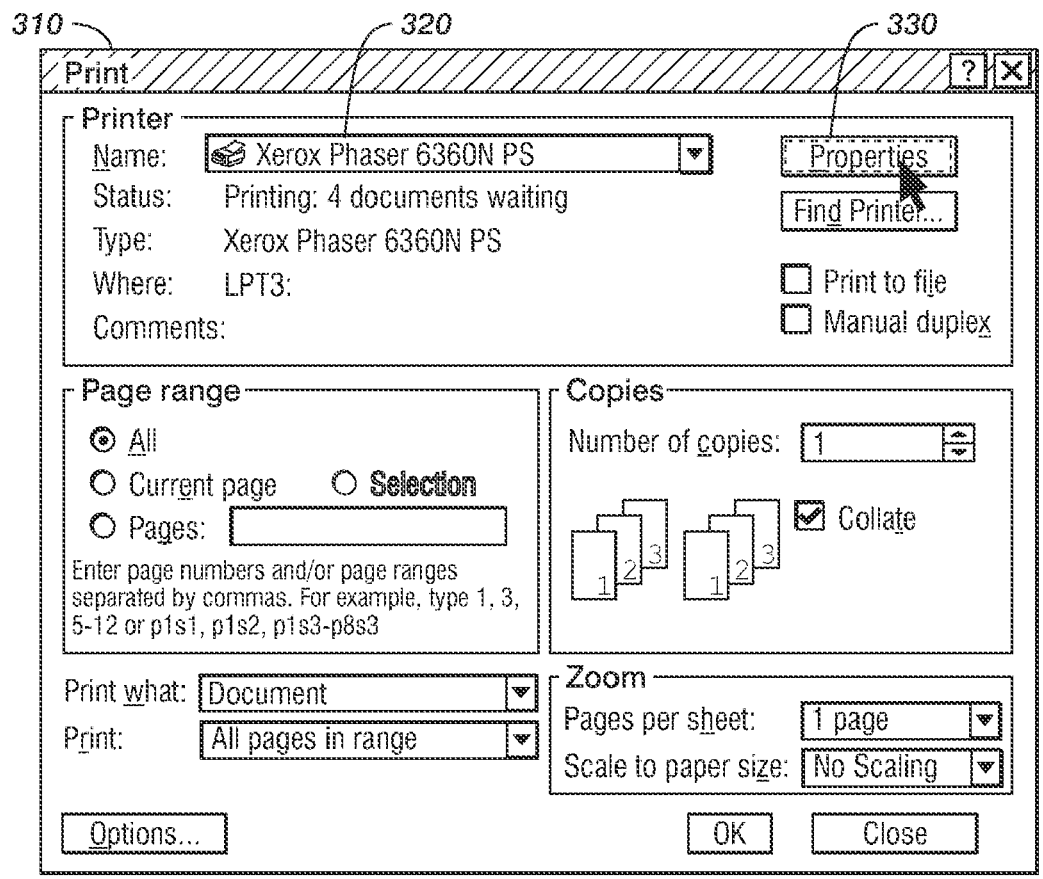
FIG. 3 illustrates a diagram of a print user interface.

FIG. 3 illustrates a printer user interface 310 that may be displayed on a display of computer 210. The printer user interface 310 may be invoked and displayed when a user selects a print function on the computer 210, typically using an input device such as keyboard 220, for example. The user may typically select a printer in the printer selection area 320. The user will typically be able to select from all printers for which a print driver has been loaded into memory of the computer 210. In the case of the FIG. 3 example, the user can select from printers through the use of a drop-down menu, and printers other than the one shown may be selected. Upon selection of properties 330, a further printer user interface 410 will be displayed. The print user interfaces 310, 410 are example interfaces, and other print user interfaces may be used.

Figure 4:
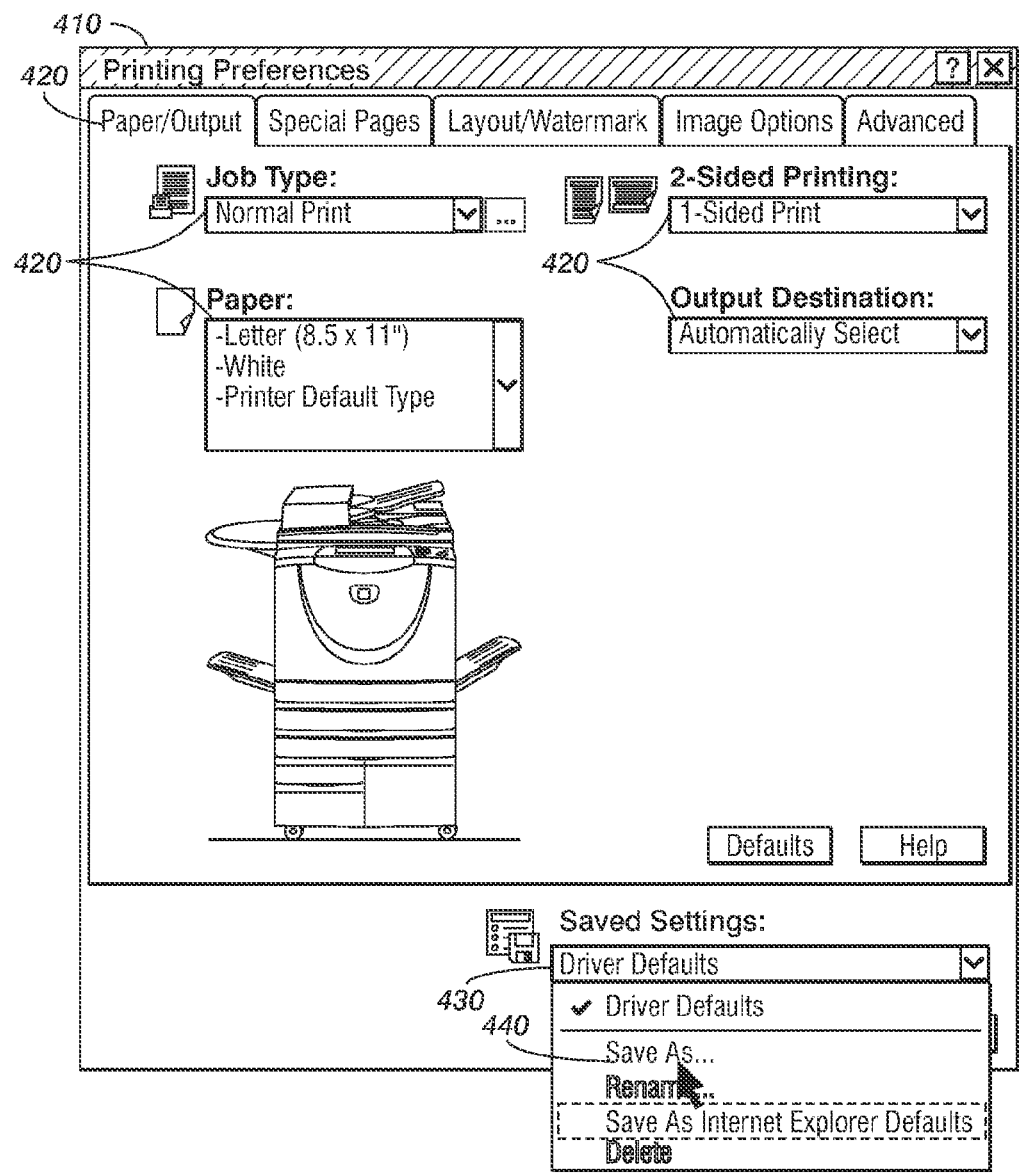
FIG. 4 illustrates a diagram of a print user interface.

FIG. 4 illustrates an exemplary diagram of a further printer user interface 410 that may be displayed on a display of computer 210, for example. The printer user interface 410 includes one or more printer document settings 420 that may be selected and set by the user. The document settings 420 are settings of an attribute of a document to be printed. The user may select and save different printer document settings 420 prior to printing. For example, the printer document settings may include paper, output, special pages, layout, watermark, image options, advanced, and so forth. The paper setting may allow selection of a paper size, a paper color, or other paper features. The output setting may include a selection of 1 or 2 sided printing, a print quality, a destination, or the like.

A layout setting may allow selection of page layout features such as portrait, landscape, number of sheets per page, or the like. A watermark setting may allow selection of watermark features such as draft, confidential, print in background, or the like. An image options setting may allow selection of features such as application reduce/enlarge, PostScript passthrough, mirrored output, or the like. An advanced setting may allow selection of features such as booklet layout, image color management, or the like.

The printer document settings shown and described herein are only examples. Any printer document settings may be used including those that are selectable by the user.

The printer user interface 410 also shows printer default setting 430 that may be saved by a user. After selecting document settings 420, the user may save the printer document settings 420 for use as a printer default setting. This may be accomplished with the printer default settings 430, which functions in the defaults/saved settings control. In the example shown in FIG. 3, this may be done with the use of a drop-down menu, that allows saving of the selected document settings 420 as a printer default setting (driver default), as an application default setting, under a user selected name as a saved default setting, or as a document default setting.

When the selected printer settings are saved as driver defaults, the printer settings may be used when the user selects the corresponding print driver via selection of the printer. Different types of printers have different print drivers, and selection of a particular printer for printing will open the corresponding print driver. If the document settings 420 have previously been saved as driver defaults, they may be used for printing with the corresponding printer unless the user manually changes the saved printer settings.

The user may also save the document settings 420 as a document default setting. When the document settings are saved as a document default setting, anytime the user prints from the default document with the corresponding printer, the document default setting will be used unless the user manually changes the document settings. For example, the user may save the document settings 420 as Document Default, as shown in FIG. 4. When the user prints the particular document with the corresponding printer, the default document setting will be invoked for printing. In particular, if the user, after saving the document settings 420 as a document default setting, selects print when the particular document is open, a printer user interface such as printer user interface 310 may be displayed. If the user then selects OK, the printing will commence with the Document Default setting, and the document settings that were saved will be used for printing.

The embodiments may automatically provide the user with the option of saving the documents settings as a document default setting with the Document Default as shown in FIG. 4, or may use the current name of the document in providing the document default setting. For example, if the document is named March Expenses, the drop-down menu may provide the option to save as "March Expenses Default."

Additionally, the embodiments allow the user to save documents settings as a saved default setting using a name that the user chooses. For example, the user can select any name to save document settings for later use using the dropdown menu of FIG. 4, using the Save As feature 440. The user can select a name and then invoke the saved settings for that name using the dropdown menu when printing a document.

Figure 5:
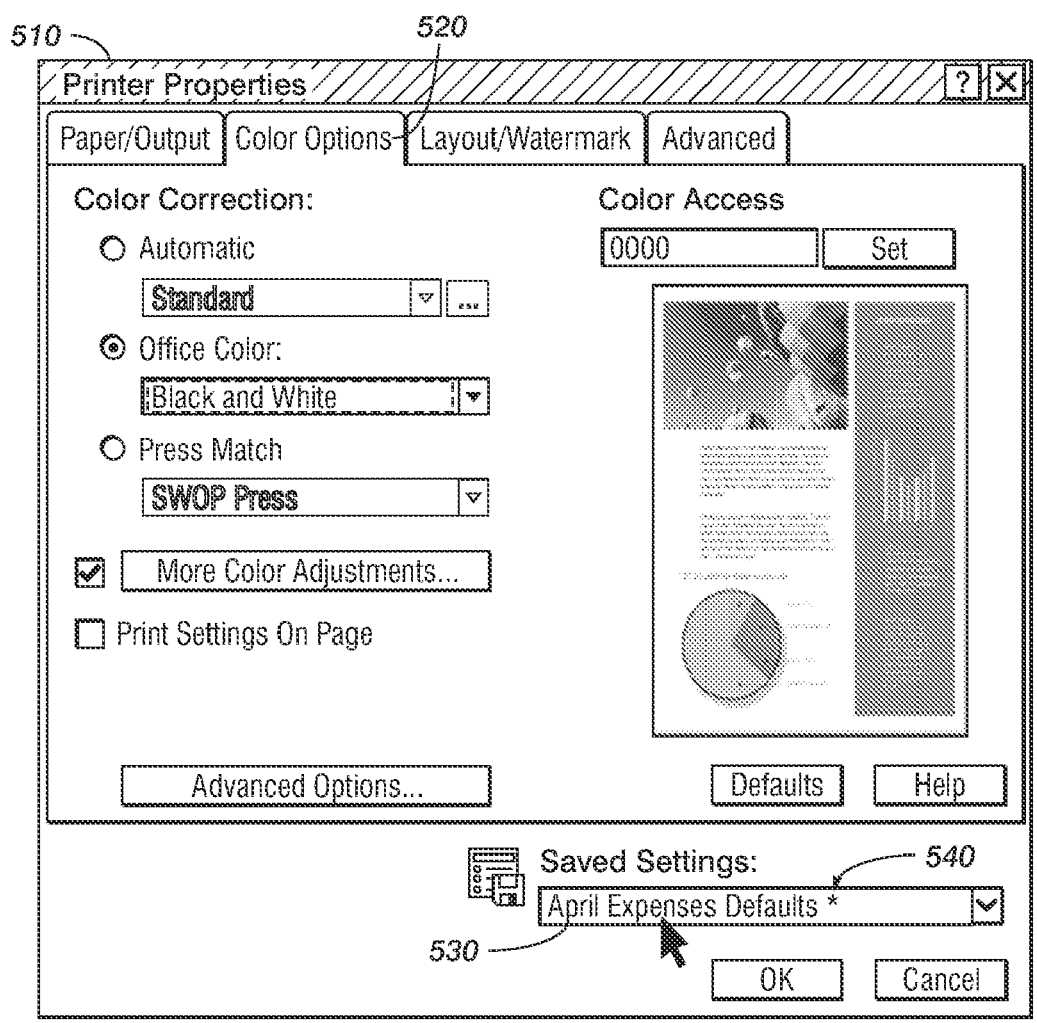
FIG. 5 illustrates a diagram of a print user interface.

FIG. 5 illustrates an exemplary diagram of a further printer user interface 510. The printer user interface 510 is illustrated with the color options document setting selected by a user, and with office color selected to black and white. Additionally, the default setting 530 has been selected as a document default, in this example April Expenses Default. The dropdown menu would allow saving this setting in other ways, such as a driver default (not specific to any application), under a default name selected by a user, or as an application default.

The print drivers in the embodiments may provide the user with a printer user interface that gives the user a choice of saving printer document settings as a default document setting of the specific document the user is using at that time. Thus, if the user is in a document named April Expenses, the print driver may include the option of save as April Expenses Default, as shown in FIG. 5. Alternatively, the drop-down list may include a list of plural document default settings that the user may choose from, and more than one document default setting could be saved at the same time.

Additionally, the user can save a first set of document settings (one or more document settings) as a first document default setting for a first document, and save a second set of document settings as a second document default setting for a second document. For example, the user could save a first set of document settings as an April Expenses Report Default setting and save a second set of document settings as a Business Plan 1 Default setting. The first and second document default settings may have the same document settings or different document settings. Any number of such document settings may be saved by a user. The first and second document default settings may also be saved for first and second documents created in different applications.

If the user has saved document settings as a document default setting, and later attempts to print that document, the document default setting will be used for printing. However, the user can manually change one or more of the document settings saved as the default document setting prior to printing. As an example, when the user selects print, the user could manually change the document setting previously saved as 1-sided print in a document default setting to 2-sided print. If the user does not save this change as a default setting, but instead clicks OK to print the particular document, the document will be printed with the 2-sided print option and the other document settings that have been saved as the document default setting.

The user may also save the 2-sided print change as a document default setting, in which case the document default setting is updated. However, where the user does not save the changed document setting as a document default setting, but instead prints without saving the changed document setting, the changed document setting will be temporarily used for printing, but will eventually revert to the originally saved document default setting. The reversion to the originally saved document default setting for printing will occur either after that particular print job (i.e., when the OK button in the FIG. 3 print user interface is selected and printing occurs), or after the document is closed.

Embodiments may also include ways of displaying the status of a saved default setting. For example, where a saved default setting has been loaded by use of the dropdown, for example, and then the user physically changes one of the document settings, the embodiments may provide a visible indicator that at least one of the document settings has been changed from those in the loaded default setting. As shown in FIG. 5, the April Expenses Default has been loaded as a document default setting. When this document default setting is loaded, the printer user interface 510 will display the various document settings that have been saved as the April Expenses Default, such as paper size, color, stapled, and so forth as shown in FIGS. 4 and 5. If the user then changes one of the document settings that have been saved as the default setting, the embodiments may include a visual indication such as the asterisk symbol 540. Other types of visual indications could be used, such as display of a different symbol, change of color in the dropdown menu, a font emphasis, or some other visual indication.

Embodiments may set a priority to saved default settings where more than one saved default setting is relevant to a particular print job, and the user does not select between the saved default settings. For example, where a user is printing an April Expenses document that is in an Excel spreadsheet application, and the user has saved a corresponding document default setting, an application default setting (for the Excel application) and a print driver default setting for the printer, the embodiments may prioritize the default setting to use first any saved document default setting, then any application default setting when there is no document default setting, and then a print driver default setting when there is no document default setting and no application default setting. This could occur when the user simply selects OK from the printer interface 310 without clicking on properties 330 in FIG. 3. The embodiments could then use the default setting with the highest priority, in this case the April Expenses document default setting. Embodiments may use any order of priority for the default settings.

However, embodiments also will provide a user with the ability to select one of the saved default settings with a lower priority for a particular print job. For example, if a user has saved certain document settings as a document default setting such as April Expenses Default, and has also saved certain document settings as a user-named default setting, and the user is printing the April Expenses document, the user could select to print with the lower priority user-named default setting by clicking on properties 330 in FIG. 3, and either selecting a previously saved user-named default setting or creating a new user-named default setting by using the Save As feature, and using the default setting to print.

The embodiments could continue to use the user-named default setting for printing of the document while the document is opened. Then, after the document is closed, the embodiments could revert to printing using saved defaults in order of their priority, which could be first use document default settings, then use application default settings, and then use driver default settings, if any.

A user may also select to print a document by using what is known as a "quick print." Such a quick print may occur when the user selects a print icon, where no print user interface is opened, but the document simply prints in response to selection of the print icon, for example. During such a quick print, if the user has previously saved documents settings as a default setting, such as a document default setting or application default setting, embodiments may use the document settings from the default setting, such as a document default setting, during the quick print.

Figure 6:
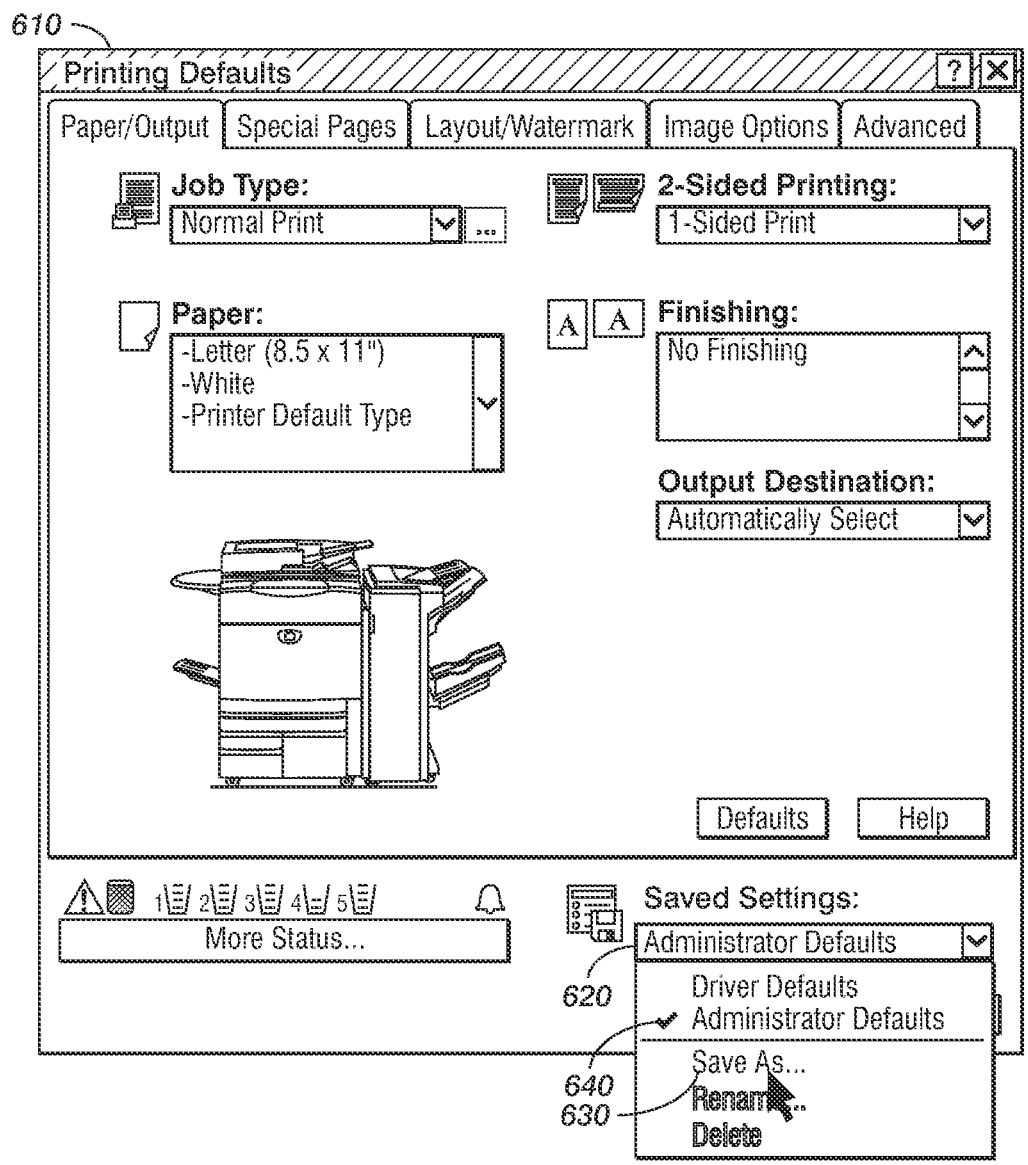
FIG. 6 illustrates a diagram of a print user interface.

FIG. 6 illustrates an exemplary diagram of a further printer user interface 610. The printer user interface 610 includes a defaults/saved settings control 620 that includes functionality allowing a user to create various default settings, and to manage and display the settings. Through the use of the defaults/saved settings control 620, the user may create and manage various default settings discussed herein for use with printing, such as a driver default setting, a document default setting, an application default setting, a user-named default setting, an administrator default setting, and a user default setting.

The defaults/saved settings control 620 will allow the user to view any default settings that have previously been created by the user, to create new default settings, to delete default settings, and to rename default settings. The defaults/saved settings control 430 shown in FIG. 4 illustrates the Save As 440 functionality allowing a user to save a new default setting. The user may also save as a driver default setting, save as an application default setting, as well as Rename a default setting and Delete a default setting.

The defaults/saved settings control 620 also includes the Save As 630, Rename, Delete, and Driver Default functionality, as well as an Administrator Defaults 640. The administrator default setting allows a user with administrative privileges to save document settings as an administrator default setting. Embodiments may prevent saving of an administrator default setting unless the user is logged as an administrator, by not displaying the Administrator Defaults in the defaults/saved settings control 620. Thus, in a network environment with many users and one or a few administrators, an administrator may set administrator defaults on a particular print driver before distribution of the driver to users. Embodiments may then restrict the document settings that would otherwise be displayed to a user based on the administrator default setting. The administrator can thus control what settings will be available for selection by users. Further, embodiments may only display the Administrator Defaults such as shown in FIG. 6 to an administrator.

Figure 7:
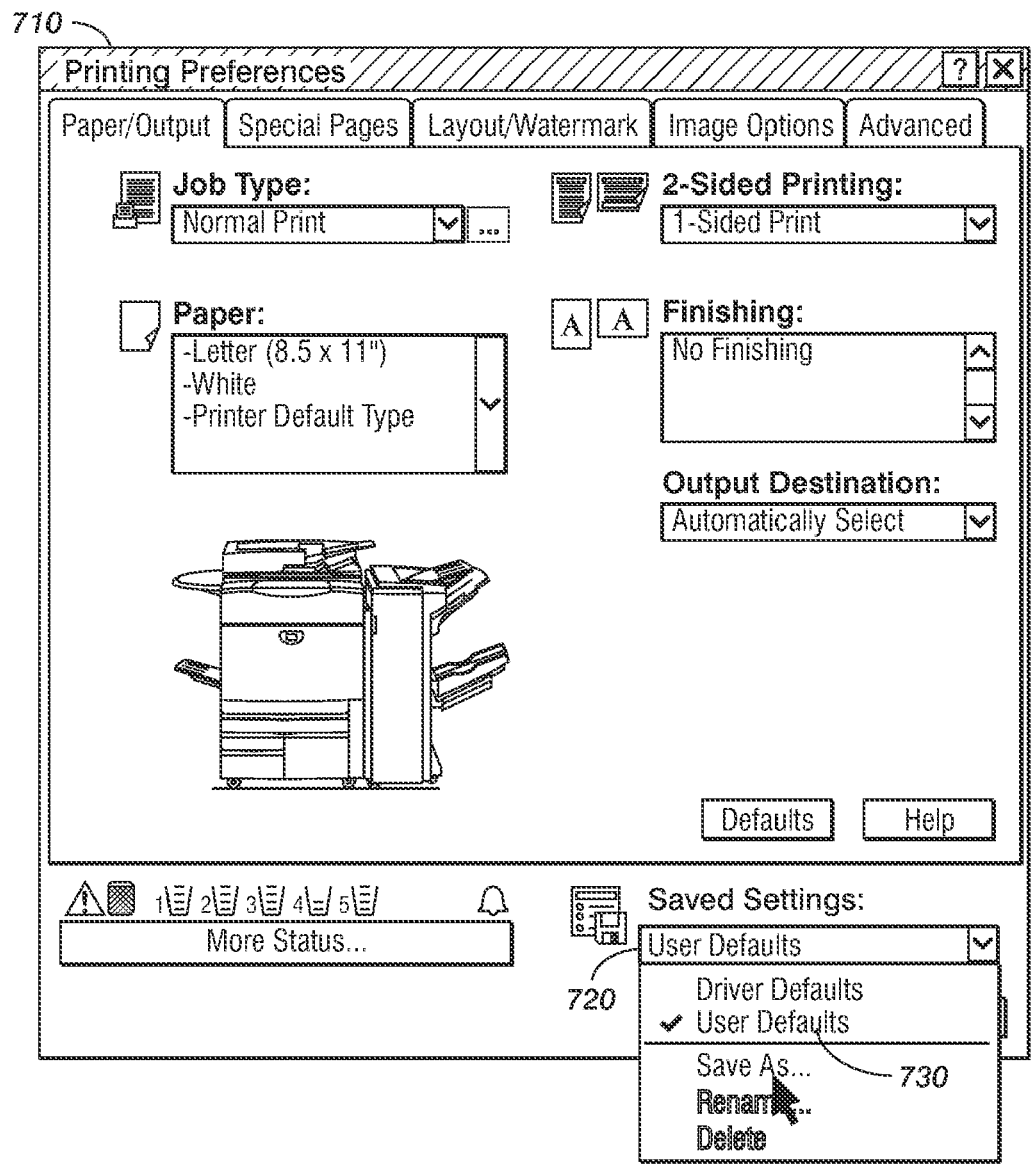
FIG. 7 illustrates a diagram of a print user interface.

FIG. 7 illustrates an exemplary diagram of a further printer user interface 710. The printer user interface 710 includes a defaults/saved settings control 720. The defaults/saved settings control 720 allows the user to manage the various control and save options for default settings, and in this example includes a User Defaults setting 730 allowing a user to save document settings as a user default setting. Thus, embodiments may determine whether a user has administrative rights or user rights, typically based on how the user has logged in, and include within the defaults saved settings control a display of User Defaults or Administrator Defaults (if these have been created and saved). This allows the interface user, whether a user or an administrator, to quickly be able to review any saved default settings, to create new default settings and to rename default settings in an easy to use and intuitive manner.

Figure 8:
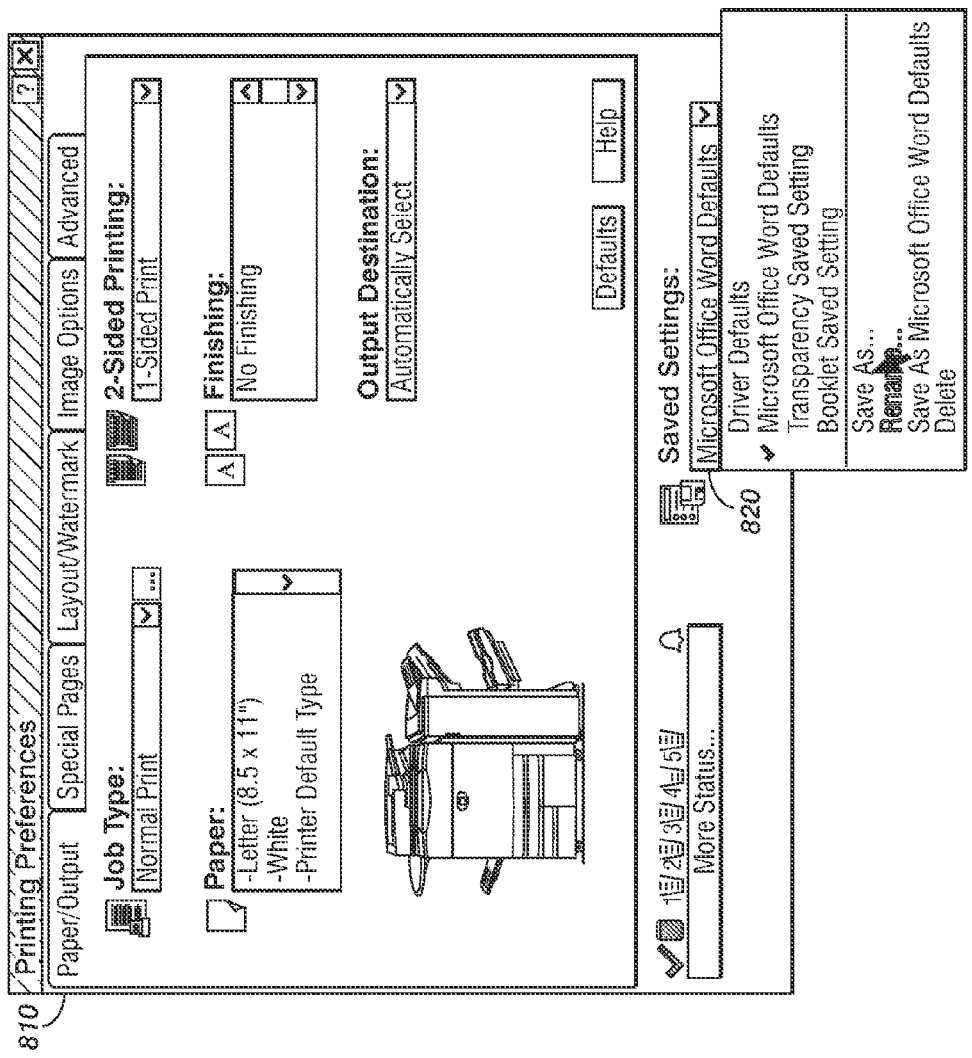
FIG. 8 illustrates a diagram of a print user interface.

FIG. 8 illustrates an exemplary diagram of a further printer user interface 810. The printer user interface 810 includes a defaults/saved settings control 820. The example shown includes an application default setting, Microsoft Office Word Defaults, shown as selected in the defaults/saved settings control 820. Further shown as selectable and previously saved default settings are the Transparency Saved Setting, the Booklet Saved Setting, both user-named saved default settings, the Driver Defaults, as well as the Save As features, the Delete feature and the Rename feature.

When applying a default setting such as a document default setting, the document settings are saved in a document default setting during what is called MergeAndConvert in the print driver world. This is when the driver has the opportunity to validate and convert an incoming DEVMODE into a valid DEVMODE. A DEVMODE is a data structure that stores the print settings that are to be applied with a particular job. It may be understood as a rudimentary "Print Ticket" in the form of a block of memory. By specifically targeting this particular callback, the document default setting is inserted into the DEVMODE before the user really has a chance to do anything in the application. Then, if the user selects printing such as through a print icon, or opens up properties in the printer user interface, the document default setting is applied.

However, if the user modifies the document settings in the printer user interface and does not save the modified document settings as a document default setting, a special flag is placed in the DEVMODE data structure to indicate the user has changed their settings in the UI of an application. The flag informs us not to save the changed settings as into the document default setting during MergeAndConvert. As such, once the user has made changes to the documents settings, they will be used during printing until we get a virgin DEVMODE again, which does not occur until the document is re-opened. This seems to follow the ideal usage of most users. However, the flag is not set when opening up the print dialog from within the context of the "Printers and Faxes" folder. In this context, the user is really changing their overall defaults, and is not then set, or it would always be there when we get in the default (virgin) DEVMODE. So, the flag is only set from within a document, and NOT from within the context of the "Printers and Faxes" folder.

Printing from a computer to a printer occurs in one of two modes, direct connect or point and print. Direct connect is where the driver stored on the computer sends print jobs directly to the printer. Point and print is where a server is connected to one or more client computers, the server acts as a print server, and the print jobs go from the client computer to the print server and then to the printer.

In a point and print environment, what typically occurs is the application and the spooler bundle up with is called EMF (Encapsulated Meta File) data, and pass it along with the DEVMODE to the print server. On the print server, the EMF file Encapsulated Meta File) is actually turned into PDL (e.g. PostScript or PCL). This is when the DEVMODE settings are typically converted into actual commands the printer can understand. However, this occurs on the server, not on the client computer, so the document defaults must have been applied prior to submitting the job to the server, or they could not be found. Accordingly, the document default setting is pushed to the print server before the application is opened, ensuring that it's 'default' DEVMODE was really one that was already manipulated. Specifically, the defaults are set during MergeAndConvert for the DEVMODE callback. Thus, when the DEVMODE is packaged up with the EMF file and sent to the server, it already has the relevant changes made to it, and the output is what the user would have expected.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 9:
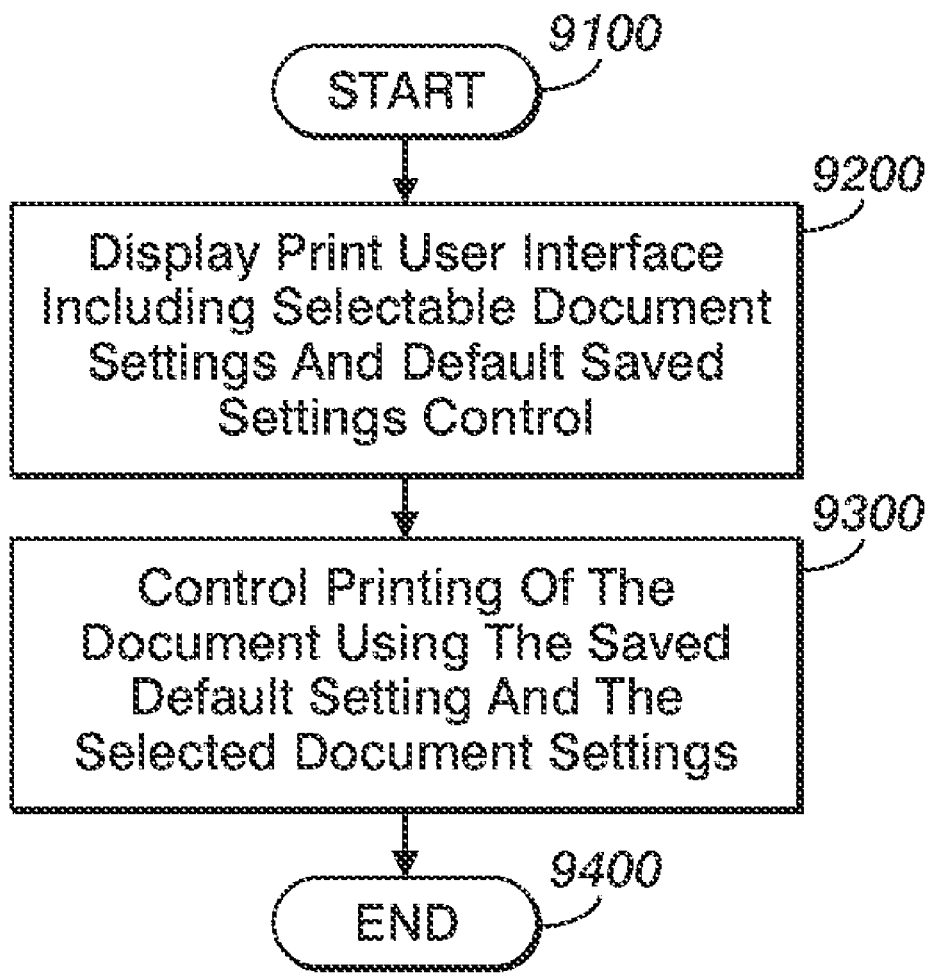
FIG. 9 illustrates a flowchart of a method for controlling a printer.

FIG. 9 illustrates a flowchart of a method of controlling a printer, as was further described herein. The method starts at 9100. At 9200, a print user interface is displayed. The print user interface includes the selectable document settings and the default/saved settings control.

At 9300, printing of the document is controlled using the saved default setting and the selected document settings. At 9400, the method ends.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of controlling operation of a printer, comprising:

displaying to a user a print user interface including selectable document settings on a screen and a default/saved settings control on the screen while displaying the selectable document settings, the default/saved settings control displaying a list of at least one saved default setting and command settings, the at least one saved default setting including selected ones of the document settings, the command settings allowing the user to create additional default settings and to delete the at least one saved default setting the default/saved settings control being expandable to show expanded default/saved settings controls while displaying the selectable document settings and the default/saved settings control being collapsible to show reduced default/saved settings controls while displaying the selectable document settings; and controlling printing of a document to print on the printer using the saved default setting and the selected ones of the document settings.

2. The method of claim 1, further comprising receiving an indication from the user to create at least one of the additional default settings, and adding the at least one additional default setting to the list when created by the user.

3. The method of claim 2, wherein the command settings further allow the user to rename the saved default setting and to rename the at least one additional default setting.

4. The method of claim 1, wherein the list includes at least one of an application default setting, a document default setting, a user default setting, and a user-named default setting.

5. The method of claim 4, further comprising receiving an indication from the user that the user desires to print with a selected default setting selected from the application default setting, the document default setting, the user default setting, and the user-named default setting, and controlling printing using selected default setting.

6. The method of claim 5, further comprising:
receiving an indication from the user of a change to one of the document settings after the user has selected the selected default setting; and
displaying a visual indication in the default/saved settings control that the user has selected a document setting different from the document settings saved as the selected default setting.

7. The method of claim 5, further comprising determining whether the user is an administrator, and allowing the user to save the selected document settings as an administrator default setting only if the user is an administrator.

8. The method of claim 7, further comprising displaying the administrator default setting in the list only if the user is an administrator.

9. An apparatus for controlling printing of a document on a printer, comprising:
a memory that stores print driver instructions; and
a processor that executes the print driver instructions to cause printing of the document when receiving a print command for printing from a user by:
displaying to the user a print user interface including selectable document settings on a screen and a default/saved settings control on the screen while displaying the selectable document settings, the default/saved settings control displaying a list of at least one saved default setting and command settings, the at least one saved default setting including selected ones of the document settings, the command settings allowing the user to create additional default settings and to delete the at least one saved default setting the default/saved settings control being expandable to show expanded default/saved settings controls while displaying the selectable document settings and the default/saved settings control being collapsible to show reduced default/saved settings controls while displaying the selectable document settings; and
controlling printing of a document to print on the printer using the saved default setting and the selected ones of the document settings.

10. The apparatus of claim 9, wherein the processor receives an indication from the user to create at least one of the additional default settings, and adds the at least one additional default setting to the list when created by the user.

11. The apparatus of claim 10, wherein the processor further controls printing by allowing the user to rename the saved default setting and to rename the at least one additional default setting using the command settings.

12. The apparatus of claim 9, wherein the list includes at least one of an application default setting, a document default setting, a user default setting, and a user-named default setting.

13. The apparatus of claim 12, wherein the processor further controls printing by receiving an indication from the user that the user desires to print with a selected default setting selected from the application default setting, the document default setting, the user default setting, and the user-named default setting, and controlling printing using selected default setting.

14. The apparatus of claim 13, wherein the processor further controls printing by:
receiving an indication from the user of a change to one of the document settings after the user has selected the selected default setting; and
displaying a visual indication in the default/saved settings control that the user has selected a document setting different from the document settings saved as the selected default setting.

15. The apparatus of claim 13, wherein the processor further controls printing by determining whether the user is an administrator, and allowing the user to save the selected document settings as an administrator default setting only if the user is an administrator.

16. The apparatus of claim 15, wherein the processor further controls printing by displaying the administrator default setting in the list only if the user is an administrator.

17. A non-transitory computer-readable storage medium, comprising:
a computer-usable data carrier storing instructions, the instructions when executed by a computer causing the computer to control printing by:
displaying to the user a print user interface including selectable document settings on a screen and a default/saved settings control on the screen while displaying the selectable document settings, the default/saved settings control displaying a list of at least one saved default setting and command settings, the at least one saved default setting including selected ones of the document settings, the command settings allowing the user to create additional default settings and to delete the at least one saved default setting the default/saved settings control being expandable to show expanded default/saved settings controls while displaying the selectable document settings and the default/saved settings control being collapsible to show reduced default/saved settings controls while displaying the selectable document settings; and controlling printing of a document to print on the printer using the saved default setting and the selected ones of the document settings.

18. The non-transitory computer-readable storage medium of claim 17, wherein the instructions further comprise instructions causing the computer to control printing by receiving an indication from the user to create at least one of the additional default settings, and adding the at least one additional default setting to the list when created by the user.

19. The non-transitory computer-readable storage medium of claim 17, wherein the list includes at least one of an application default setting, a document default setting, a user default setting, and a user-named default setting, and wherein the instructions further comprise instructions causing the computer to control printing by receiving an indication from the user that the user desires to print with a selected default setting selected from the application default setting, the document default setting, the user default setting, and the user-named default setting, and controlling printing using selected default setting.

20. The non-transitory computer-readable storage medium of claim 19, wherein the instructions further comprise instructions causing the computer to control printing by:
   receiving an indication from the user of a change to one of the document settings after the user has selected the selected default setting; and
   displaying a visual indication in the default/saved settings control that the user has selected a document setting different from the document settings saved as the selected default setting.

* * * * *